(12) United States Patent
Menne et al.

(10) Patent No.: US 7,478,529 B2
(45) Date of Patent: Jan. 20, 2009

(54) HYDRODYNAMIC CLUTCH AND METHOD FOR INFLUENCING THE TORQUE THAT CAN BE PICKED UP BY THE HYDRODYNAMIC CLUTCH

(75) Inventors: Achim Menne, Crailsheim (DE); Heinz Hoeller, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 10/579,434

(22) PCT Filed: Nov. 10, 2004

(86) PCT No.: PCT/EP2004/012701

§ 371 (c)(1),
(2), (4) Date: May 15, 2006

(87) PCT Pub. No.: WO2005/050047

PCT Pub. Date: Jun. 2, 2005

(65) Prior Publication Data
US 2007/0028605 A1    Feb. 8, 2007

(30) Foreign Application Priority Data
Nov. 14, 2003    (DE)    ............... 103 53 517

(51) Int. Cl.
*F16D 33/02*    (2006.01)
(52) U.S. Cl. ............................................. 60/353
(58) Field of Classification Search ............ 60/352, 60/353, 365
See application file for complete search history.

(56) References Cited

U.S. PATENT DOCUMENTS

| | | | |
|---|---|---|---|
| 2,638,350 A | 7/1954 | Odman | |
| 2,851,858 A | 9/1958 | Grosskopf | |
| 3,260,052 A * | 7/1966 | Heinz | 60/365 |
| 3,270,838 A * | 9/1966 | Schweizer | 60/365 |
| 4,043,434 A * | 8/1977 | Braschler | 60/353 |
| 4,094,143 A * | 6/1978 | Schlegel et al. | 60/353 |
| RE29,928 E * | 3/1979 | Bopp | 60/353 |
| 4,625,512 A * | 12/1986 | Morrow, Sr. | 60/353 |
| 6,021,875 A * | 2/2000 | Sasse | 192/3.21 |
| 6,898,931 B2 * | 5/2005 | Iwao et al. | 60/352 |

FOREIGN PATENT DOCUMENTS

| | | |
|---|---|---|
| DE | 1196438 | 7/1965 |
| GB | 988962 | 4/1965 |

* cited by examiner

*Primary Examiner*—Michael Leslie
(74) *Attorney, Agent, or Firm*—Ice Miller LLP

(57) ABSTRACT

The invention relates to a hydrodynamic clutch which comprises a primary impeller and a secondary impeller which together define a working chamber. The clutch also comprises means for influencing the transmission behavior of the hydrodynamic clutch, especially for influencing the circulation flow in the working chamber, said means comprising at least one baffle plate that extends at least partially into the working chamber. The inventive clutch is characterized in that the baffle plate can be displaced in the axial direction relative to the working chamber.

20 Claims, 8 Drawing Sheets

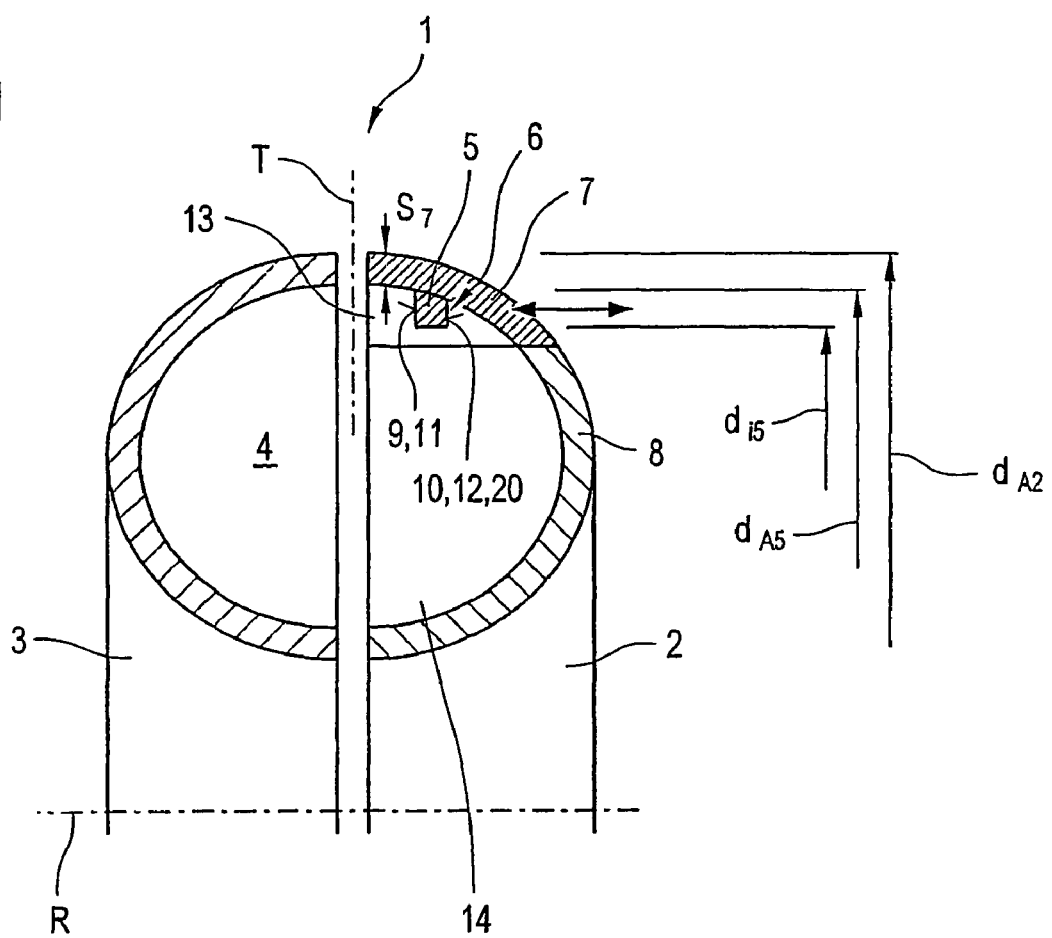

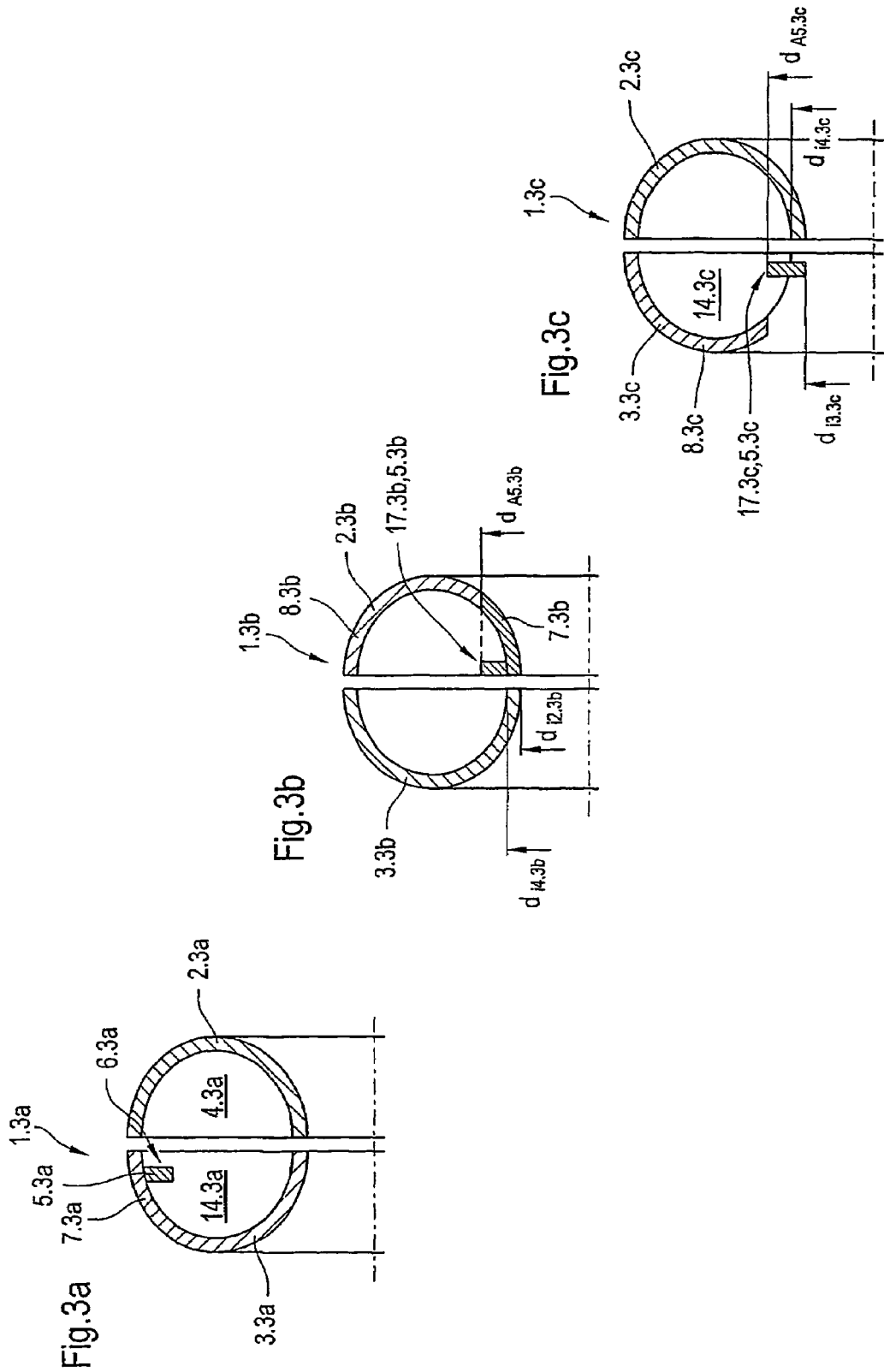

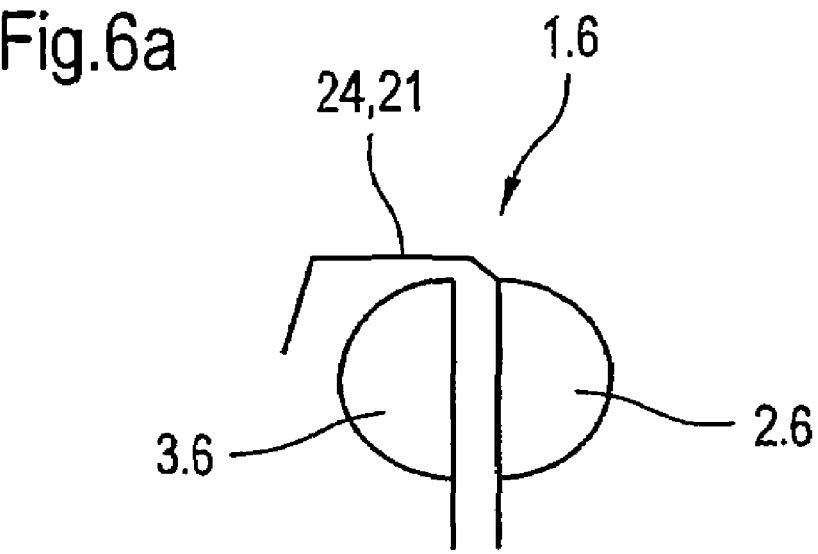
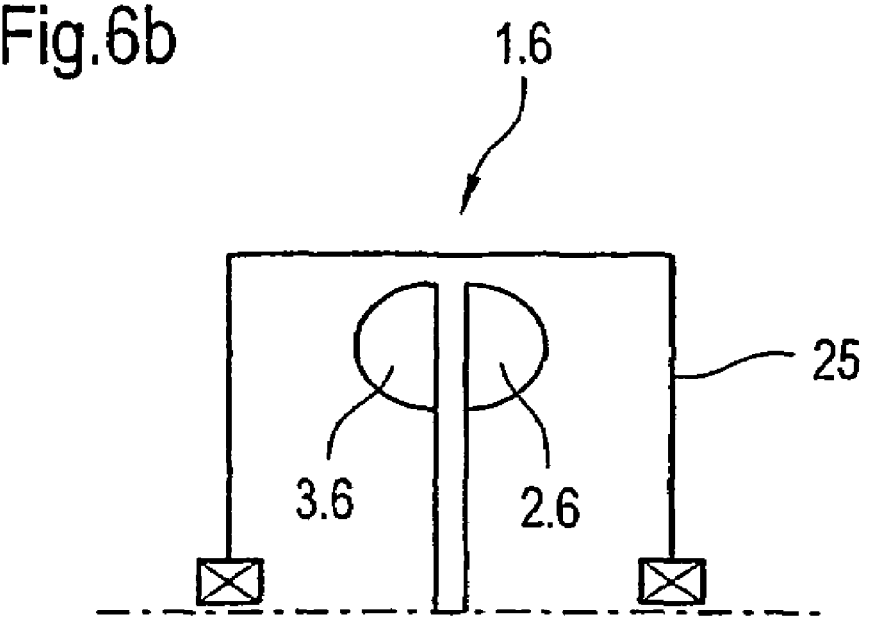

Fig.7
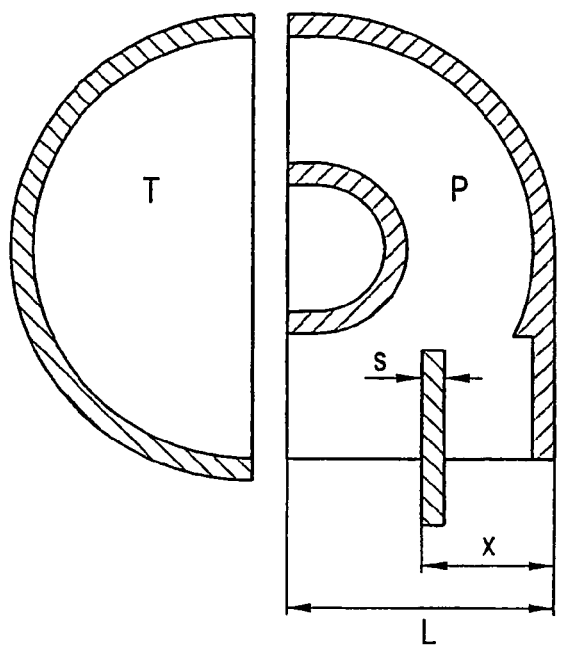
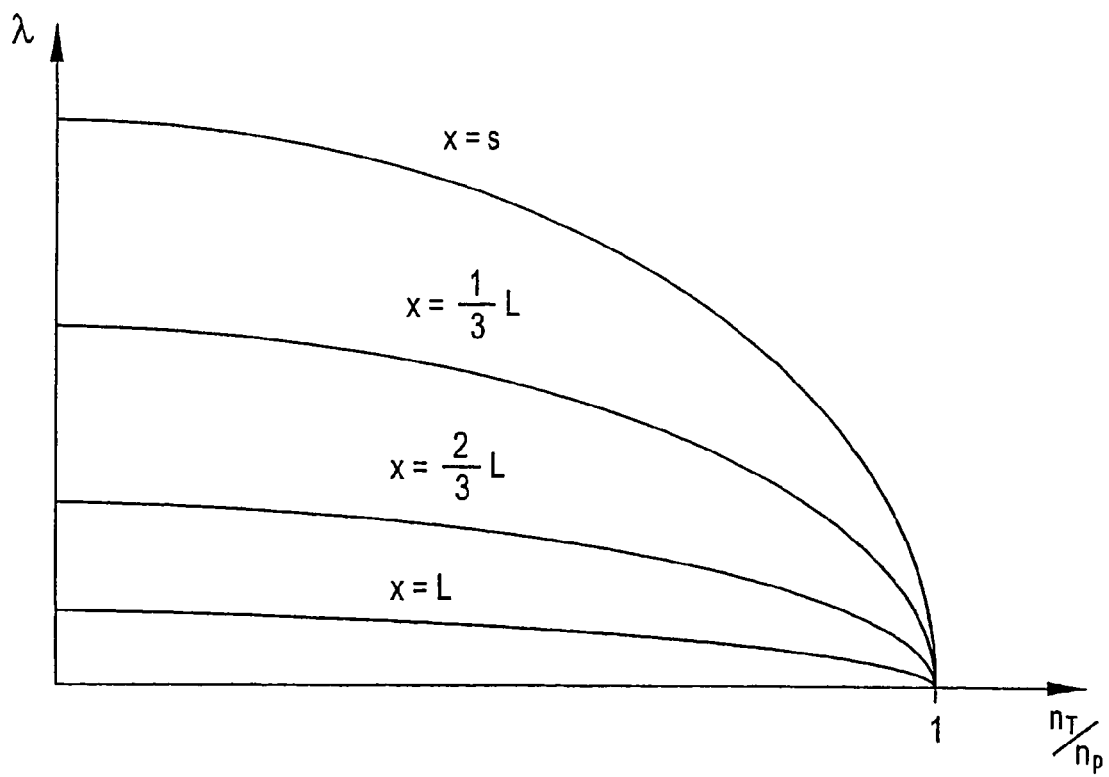

HYDRODYNAMIC CLUTCH AND METHOD FOR INFLUENCING THE TORQUE THAT CAN BE PICKED UP BY THE HYDRODYNAMIC CLUTCH

The present application is a U.S. National Application of PCT/EP2004/012701 (the "Application"), filed Nov. 10, 2004, by Voith Turbo GmbH & Co. KG, which claims priority to German application number 10353517.9, filed Nov. 14, 2003, the contents of which are herein incorporated by reference.

The invention relates to a hydrodynamic clutch with the characteristics in detailed in the preamble of claim 1; and additionally a method for influencing the torque that can be picked up by the hydrodynamic clutch.

BACKGROUND

From the state of the art, hydrodynamic clutches in start-up units for vehicles are known in a multitude of implementations. The start-up unit comprises thereby a drive that can be coupled to an input and an output that can be coupled to a power take-off. The hydrodynamic clutch which comprises a primary impeller and a secondary impeller, that together form a toroidal working chamber, is arranged between the input and the output. The primary impeller is thereby, for example, provided with a so-called primary impeller cup that is torque proof connected to it, and that encloses the secondary impeller in the axial direction, and completely in the circumferential direction. In addition, the start-up unit comprises a controllable clutch in the form of a direct-drive clutch that is arranged parallel to the hydrodynamic components, in particular the clutch, and that can be controlled together with it or on its own. This means that through both clutches two power branches are created, whereby the power flux either takes place only through one of the clutches, or collectively through both. The controllable clutch comprises thereby at least a clutch input element and a clutch output element, whereby the clutch output element is coupled, at least indirectly torque proof, to the secondary impeller. The input clutch element is connected, at least indirectly torque proof, with the primary impeller and/or the input. The means for the creation of a frictional contact between the individual clutch elements comprise thereby a piston element that can be impacted upon by a pressure medium. It can be arranged separately from the clutch disks or else formed directly on the secondary impeller in particularly compact implementations. The hydrodynamic clutch is in addition provided with a utilities supply system. The clutch can thereby be flowed through centrifugally and centripetally. In the case of centripetal flow-through, the utilities are led, via the utilities supply channel, along the outer circumference of the secondary impeller and injected into it in the radial direction in the region of the outer circumference of the toroidal working chamber. The force created by the utilities is thereby utilized to keep the controllable clutch in a relaxed state or to operate with at least a certain amount of slippage, respectively. The exit from the toroidal shaped working chamber thereby takes place in the region of the radial inner diameter of the working chamber in a space that lies thereunder and which is also designated as a second utilities guide channel or chamber. The first utilities channel and/or chamber, that is restricted by the inner circumference of the casing and the outer diameter of the secondary impeller, as well as the second utilities supply channel and/or chamber can thereby be interchanged as regards their function. This is necessary in particular during the change over from centripetal to centrifugal flow-through. The supply of the utilities for the hydrodynamic coupling takes place via the second utilities supply channel and/or chamber in the region of the radial inner diameter of the working chamber, whereby the exit takes place in the region of the radial outer diameter of the working chamber on one of the impellers or between both. The controllable clutch is then activated. In such start-up units the performance ratio can thus be varied via the individual clutches—controllable clutch or hydrodynamic clutch. It is thereby in particular during the operation of the hydrodynamic clutch desirable that, for the avoidance of a negative retroaction on the number of revolutions of the driving machine, the torque that can be picked-up by the hydrodynamic clutch and that corresponds to the torque that can be picked-up by the primary impeller, is kept as low as possible. This is attempted by adjustment of a minimal fill factor. However, it has become clear that this measure only is insufficient since exactly in the range of very high coupling slippage, for example of 70 to 100 percent, torques that are too high are still picked-up by the clutch. It can lead therefore to an undesirable retroaction in the form of suppression of the number of revolutions of the driving machine that is coupled to the hydrodynamic clutch, so that then the desired driving dynamics is no longer present.

SUMMARY

The invention therefore had as a basis the task to create a hydrodynamic clutch of the kinf mentioned in the introduction for the application of start-up units in which, with the smallest constructive and control technical complexity, a minimal idle torque, i.e. in particular of the, via the hydrodynamic clutch, at maximum slippage absorbable torque in the start-up and/or start region, can be attained.

The solution according to the invention is characterized by the features of claim 1. Advantageous embodiments are represented in the sub claims.

According to the invention, a hydrodynamic clutch which comprises at least a primary impeller and a secondary impeller, is provided with means for the influencing of the transmission, in particular means for the influencing of the circulation flow in the working chamber, which comprise, at least, an element that forms an interference and/or baffle region, in particular baffle plates that extend at least partially into the working chamber and that according to the invention can be displaced in the axial direction, i.e. parallel to the rotation axis of the hydrodynamic clutch, in the working chamber. By the interference and/or the baffle region, a region is meant that, viewed in cross section of the theoretical progression and/or direction of the circulation flow, briefly deflects at least over a sub range in the circumferential direction. The deflection, i.e. direction change, takes place thereby toward the direction of the central diameter of the working chamber and/or the core chamber. The available flow cross section tapers in the region characterized by the baffle region. The interference and/or baffle region is thereby arranged in such a way that it is characterized by at least one interference surface which is constructed either perpendicular, or at an angle, to the flow progression of the circulation flow in a work cycle in this range, and which stretches, preferably completely in the circumferential direction, over at least a part of the region of the working chamber.

The element that forms the interference or baffle region is preferably arranged in the shape of a washer, whereby the cross section can be arranged arbitrarily. The restricting effect takes thereby place in the circumferential direction over the total circumference in the working chamber. Embodiments of elements are conceivable that form an interference or baffle region in the form of a partly ring shaped element or segment.

The solution according to the invention allows for a freely variable influencing of the transmission of the hydrodynamic clutch dependent on the freely chosen position of an element that forms the interference or baffle region, in particular the baffle plate in the working chamber, during each operation phase, and thereby of its effect on the circulation flow which establishes itself in the working chamber. According to. the position of the element that forms the interference or baffle region, in particular the baffle plate and the arrangement of the interference and/or baffle region formed by these in the working chamber, the transmission of the hydrodynamic clutch can be influenced in a controlled way at a certain slippage by a change of the position of the element that forms the interference or baffle region and the magnitude of the provided displacement as well as the displacement speed over a slippage region. The element that forms the interference or baffle region, in particular the baffle plate, is in the starting position, i.e. at rest, located in the region of the parting plane between the two impellers. During a decrease of the slippage, a displacement over the axial extension of the respective impeller takes place in axial direction away from the center and/or the core chamber of the working chamber. The influence of the baffle plate, in particular an interference and/or active surface which acts on the circulation flow through it, can thereby be adjusted in a targeted way over the total operation range of the hydrodynamic clutch, preferably over the total slippage range. It is thereby possible to influence the transmission of the hydrodynamic clutch also over a wider range up to the total operation range. This influencing is characterized at least as a function of the axial position of the baffle plate and the geometric dimensions of the baffle plate. The change of the action of the baffle plate arises then dependent on the change of the position of the baffle plate in axial direction via the slippage.

In order to achieve the desired performance curve characteristics, the means for the influencing of the circulation flow constitute either at least an external or an internal interference and/or baffle region in the working chamber. Preferably, it is assigned one of the two impellers. According to the construction and implementation, the baffle plate is constructed in such a way that it forms, in relation to the working chamber, either an external baffle or an internal baffle. In the case of a construction as an external baffle, the element that forms the interference or baffle region, in particular the baffle plate, is arranged in the region of the radial external dimensions of the working chamber, while in the case of an implementation as an internal baffle, the element that forms the interference or baffle region, in particular the baffle plate, extends inside the working chamber from the its inner diameter in the radial direction. However, preferably a placement is chosen which lies in the region of the inner diameter of the working chamber, whereby in this case an especially compact construction of the hydrodynamic clutch with the accompanying control equipment for the element that forms the interference and/or baffle region, in particular the baffle plate, can be realized.

The element that forms the interference or baffle region, in particular the baffle plate, is preferably always assigned one of the impellers. The assignment can thereby take place for the primary impeller as well as for the secondary impeller. The effect is dependent on the assignment of the same. The displacement takes place thereby, starting from the region of the parting plane, or a region that is adjacent to it, over at least a part, preferably the total axial extension of the part constructed from the respective impeller, of the working chamber. That is, the displacement takes place in the axial direction away from the geometrical center of the working chamber and the core chamber, respectively.

The element that forms the interference or baffle region, in particular the baffle plate, can thereby be constructed as a separate component but can also constitute with a part of this impeller a structural unit, i.e., it can be constructed as a one-piece component, constituent of one of the impellers. The baffle plate can in the first case be a) on the respective impeller or b) an element connected to it torque proof or c) a stationary component or casing or d) an element assigned to the baffle plate which rotates with a relative rotational speed with respect to the impeller.

The element that forms the interference or baffle region, in particular the baffle plate, according to the implementation as an external baffle or an internal baffle, is in case a) provided in the region of its inner diameter or its outer diameter with slits, whereby the slits extend in the axial direction—in case of slantwise blading at least with one direction component in the circumferential direction—and serve to absorb the baffles of the blading that are used for guidance. The guidance of the baffle plate then takes place at the blading whereby the blading in the guiding region is free from a linkage to the part that carries the baffle. This means that in this region the working chamber is not restricted by the internal contour of the part that carries the blade, but projects freely over the blades in the radial direction. The guiding slits are thereby to be adjusted to the blading, whereby the slits, according to implementation of the blading, is constructed as straight or slanted blading. In case of the guidance of the baffle plate on a respective impeller, a uniform rotation speed between the element that supports the baffle plate and the respective impeller must always be ensured. In essence, for the implementation of the guiding slits and the axial movability of the baffle plate in the case of slanted blading, the following possibilities exist:

a) the element that forms the baffle plate and/or the interference or baffle region, is led for a change in position in the axial direction in the circumferential direction along the slantwise oriented blading, or b) the guiding slits are constructed with such a width in the circumferential direction that also in the case of a slanted blading a pure axial displacement, without a rotation, of a certain magnitude in the circumferential direction is possible.

According to a particularly advantageous embodiment, in which the guiding of the element that forms an interference or baffle region, in particular the baffle plate, can take place independently from the implementation of the hydrodynamic clutch, in particular of the blade carrying parts and on other components according to c) and d), is characterized by that the respective impeller, viewed in cross section, is in the radial direction correspondingly turned away. A ring-shaped element is thereby abraded with respect to the blading either in the region of the external circumference or in the region of the internal circumference, whereby the blading, viewed in cross section, is characterized by blade sides and/or blade ends that are constructed in radial direction parallel to the rotation axis. This means that the ring-shaped turning-away extends over the total axial extension of the respective impeller or at least a part of the region of certain magnitude which corresponds at least to the sum of the displacement and the width of the baffle plate. The baffle plate can then be displaced in the region of the parting plane over the total extension and even beyond it relative to the respective impeller, whereby the baffle plate can be supported also by a stationary element or an element which rotates with a relative rotation speed with respect to the respective impeller, and which can be guided on it displaceable in the axial direction.

In the other case, i.e. in the case of a structural unit with cycle leading wall regions, the baffle plate is a component of a wall region, preferably a section of the blade carrying part of one of the two impellers. In this case a displacement of the baffle plate in axial direction can only take place via a displacement of the cycle leading section of the blade carrying part of the respective impeller. This is realized by that, viewed in cross section of the hydrodynamic component, a segment of an impeller can be displaced in the axial direction. This segment involves thereby a region in the region of the radial external dimensions of the working chamber or in the region of the radial internal dimensions of the working chamber that lies in a sub region of the respective impeller. The guidance thereby takes place coaxially with the hydrodynamic component, in particular the respective impeller. The magnitude of the displacement can be fixed according to the construction and the choice of the segment on the respective impeller. The displacement can thereby take place up to a concise seal with the blade carrying part, or else up to the point that the blade carrying part forms a limit stop for the displacement of the baffle plate and thereby the segment in axial direction of the impeller.

With respect to the construction of the baffle plate itself a plurality of possibilities exists. In the simplest case it is constructed as a washer shaped element comprising two parallel to each other oriented and active-surface-forming front sides, whereby the front sides, seen in the assembly position, extend perpendicular to the rotation axis. According to a particular advantageous construction, the contour, in particular the active surface which is constructed on the baffle plate, can be constructed with a geometrical shape and contour in such a way that it has additional advantageous properties with respect to the guidance of the circulation flow. Preferably, shapes for the active surfaces are thereby chosen of which each in the flow direction extends, rising in the flow direction, into the working chamber from the region of the external diameter and/or the internal diameter. This means that the active surface is not constructed as a purely perpendicular oriented surface with respect to the circulation flow but allows a guidance of the circulation flow along it in all states of operation, whereby the reversal and/or direction change takes place gradually. The contour is preferably chosen in such a way that it, when fully displaced with respect to the respective impeller, is modeled in this setting on the geometry of the internal contour of the blade carrying region and thereby the blade bottom. In this case influencing is no longer created out in the state in which an influencing is no longer desired, since the baffle plate takes over the function of the missing blade carrying section.

The element that forms the interference or baffle region, in particular the baffle plate, is assigned a control unit for the realization of the displacement. This unit can be constructed in an arbitrary manner and can be driven mechanically, hydraulically, pneumatically, electrically, or by a combination of these possibilities.

Preferably, hydraulic or pneumatic solutions are chosen. The displacement then results, for example, from the, at least indirect, connection of the element that forms the interference or baffle region, in particular the baffle plate, to a cylinder-/piston unit, whereby the actuation of the piston can take place with pressure from an arbitrary pressure source. The actuation pressure can thereby be built from, for example, a) a pressure that corresponds to the pressure in the supply channel or chamber or one proportional to this pressure at hand, or
b) the pressure inside the casing
c) an overpressure from a) and b), or
d) a pressure that is freely chosen, or
e) an arbitrary pressure that is in any case available in the power train, for example, transmission pressure, etc.
f) an overpressure from one of the in a) to c) mentioned pressures and a pressure according to d) or e).

The solution according to the invention is appropriate for any type of hydrodynamic clutch. It can thereby involve hydrodynamic clutches with rotating casing, i.e., with a primary impeller cup that is attached torque proof with the primary impeller as well as hydrodynamic clutches with casing that is stationary, i.e., at rest. In addition, the solution according to the invention can be employed in particular in start-up units which comprise a start-up element in the form of a hydrodynamic clutch with an assigned device for the bridging in the form of a direct-drive clutch. In this case, the direct-drive clutch is preferably constructed as a disk clutch and arranged parallel to the hydrodynamic clutch. The hydrodynamic clutch is assigned a utilities supply system and/or guidance system that allows for a centrifugal and centripetal flow through the hydrodynamic clutch. In the case of centripetal flow through, thereby at least a part of the, around the external circumference of the hydrodynamic clutch guided, and in the region of the external circumference in the parting plane inserted, utilities for the actuation of the direct-drive clutch. These utilities are deactivated by the pressure available to the direct-drive clutch in this operation state, i.e., the elements that can be brought into active frictional engagement are kept at a distance from each other.

In the case of centrifugal flow through the utilities supply takes place in the region of the internal diameter of the toroidal working chamber and the flow through takes place in the centrifugal direction, i.e., outwards from the region of the external circumference of the hydrodynamic clutch. The unit consisting of a hydrodynamic clutch and direct-drive clutch is thereby provided with a first utilities supply channel or chamber which is at least constructed between the control equipment of the direct-drive clutch and a casing that encloses the unit. In addition, a second utilities supply channel or chamber is provided which is arranged in the region of the external circumference on the internal diameter of the toroidal working chamber. The assignment in the case of chambers can be specified according to choice as a supply channel or supply chamber or removal channel or removal chamber to or from the working chamber. This is realized via a corresponding control equipment in the utilities supply and/or guidance system, whereby these are preferably constructed in the form of valve devices. According to the choice of the controlled value of the control unit assigned to the, in axial direction slidable, baffle plate, then also the pressures that are available in the utilities supply channels or chambers can be employed for actuation.

According to a particular advantageous implementation, the hydrodynamic clutch, in particular the blading, is constructed with a core ring. This means that the blading in the core chamber is provided with a recess on every other impeller, in particular on the ends that point to the turbine wheel, which, viewed for the total blading, describes a corresponding cavity. In addition, the blading can be varied on both impellers. The secondary impeller is preferably bladed slantwise. In analogy, this applies also to the blading in the exit region from the primary impeller. It thereby becomes possible to achieve better $\lambda$-values. On the other hand, the blading is constructed straight in the region of the intake at the primary impeller in order to make here a rectilinear displacement of the baffle plate possible in the arrangement in the region of the inner diameter of the working chamber.

In analogy, this also applies in the reverse to the arrangement of the baffle plate in the region of the external diameter of the working chamber, whereby then the slanted blading follows the pump intake. However, preferably the first variant is chosen. This means that an individual blade on the primary impeller does not proceed rectilinearly or at an angle with respect to the radial direction, but includes a first sub region that proceeds in the radial direction and a second sub region that proceeds at an angle with respect to the radial direction.

BRIEF DESCRIPTION OF THE DRAWINGS

The solution according to the invention is clarified in the following with the aid of figures. In these the following is depicted in detail:

FIG. 1 demonstrates in a schematically simplified representation the basic principle and the basic construction of a hydrodynamic clutch configured according to the invention with an axially displaceable baffle plate;

FIGS. 3a to 3c demonstrate additional possible arrangements of the baffle plate;

FIG. 6a demonstrates an application in a clutch with rotating casing;

FIG. 6b shows an implementation with a stationary casing;

FIG. 7 demonstrates with the aid of performance curves the operation mode of the baffle plate in different positions.

DETAILED DESCRIPTION

Figure 2B:
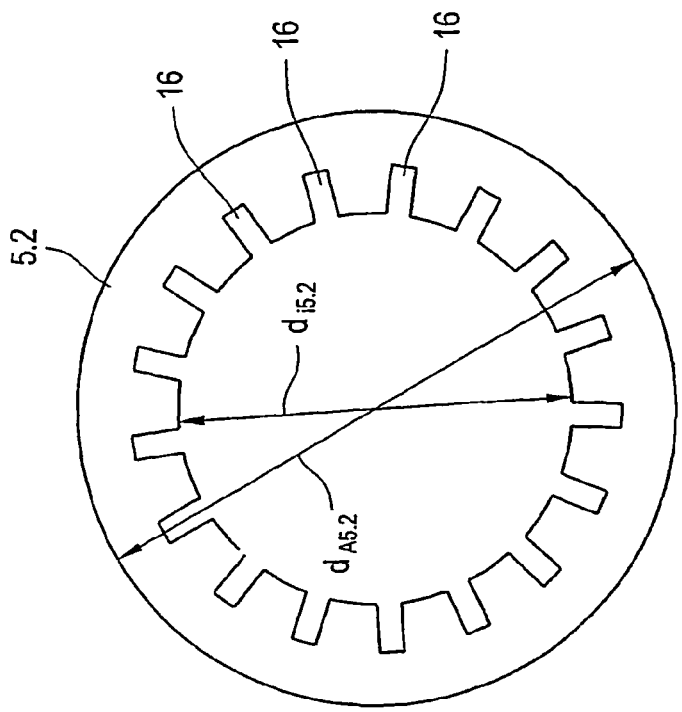
FIGS. 2a and 2b demonstrate a construction with guidance of the baffle plate at the blading.

FIG. 1 demonstrates in a schematically very simplified representation the basic construction and the basic principle of a hydrodynamic clutch 1 configured according to the invention which comprises at least a primary impeller 2 and a secondary impeller 3, which together form a working chamber 4, with a, coaxially with respect to the clutch 1 arranged, and in the axial direction displaceable, element that forms a baffle region or interference region, in particular in the form of a baffle plate 5. In this implementation, the baffle plate 5 is assigned the primary impeller 2 which can be coupled to a drive. The baffle plate is thereby constructed in the shape of a washer. It extends with its active surface into the working chamber 4 in the radial direction. The arrangement of the baffle plate 5, depicted in FIG. 1, involves a so-called external baffle 6. It is characterized by that it becomes active in the region of the radial external diameter $d_{A4}$ of the working chamber 4. The baffle plate 5 can thereby be displaced in the axial direction, i.e., parallel to the rotation axis R of the hydrodynamic clutch 1. Viewed from the startup procedure of the clutch 1, the displacement thereby takes place starting from a region in the region of the parting plane T over at least a sub region of the axial extension of the respective impeller, here of the primary impeller 2. The axial displacement can thereby take place only over a sub region of the extension of the respective impeller, here of the primary impeller 2, or else preferably completely beyond the total impeller 2. In the implementation represented in FIG. 1, the baffle plate 5 is a component of a wall region 7 of the blade carrying part 8 of the respective impeller, here of the primary impeller 2, whereby this wall region 7 is provided in essence in the region of the external diameter $d_{A2}$ of the primary impeller 2 and this wall region 7 can be displaced in the axial direction contrary to the remaining not displaceable blade carrying part 8.

According to the location of the wall region 7, also a displacement of the baffle plate 5 results as a consequence of the forced coupling. The baffle plate 5 is in this case characterized by an internal diameter $d_5$ which is smaller than the diameter $d_{A4}$ that determines the external diameter of the working chamber 4, but larger than the internal diameter $d_4$ of the working chamber 4 in the region of the parting plane T. The external diameter $d_{A5}$ of the baffle plate 5 corresponds in this case to the external diameter $d_{A4}$ of the working chamber 4 or, in the concrete case of the primary impeller 2, the internal diameter $d_{i7-2}$ of the primary impeller, which is characterized by the internal diameter which characterizes the wall region 7 in the radial external region of the primary impeller 2. This diameter involves thereby the difference between the theoretical external diameter $d_{A2}$ of the primary impeller and the wall thickness S7 of the wall region 7. As an example, the baffle plate 5 is in the depicted case constructed as a flat disk. It comprises two front sides 11 and 12, each of which forming a flat front surface 9 and 10, whereby each of the front surfaces 9 is directed away from the parting plane T at the front side 12, and points in the displacement direction in relation to the initial position of the baffle plate 5 at the beginning and possibly during the starting procedure. The front surface 10 represents thereby at least partly, in the represented case completely, the active and/or influencing surface 20 for the circulation flow in the working chamber 4. The wall region 7 of the blade carrying part 8 is thereby displaceable in the implementation represented in FIG. 1. Connected to these, also the blade region 13 of the blades 14 that is attached to it, can be constructed such that it can be displaced along it. The blades 14 are then subdivided. The blade carrying part 8 and/or the wall region 7 of the blade carrying part 8 with the connected blade region 13 is thereby as well constructed in the shape of a ring. However, both are torque proof coupled to each other and implemented displaceably relative to each other. This implementation guarantees complete displaceability in relation to the remaining blade carrying part 8 in the axial direction, independent of the magnitude of the displacement I in the axial direction that is provided for the operation mode.

However, as is not shown in FIG. 1, also the displacement of only the wall region 7 without coupling to the blade region 13 is conceivable. The wall region 7 is in this case only used for the flow guidance and does not primarily serve for the position fixation and attachment of the blades 14. This takes place through the remaining blade carrying region 8.

Figure 2A:
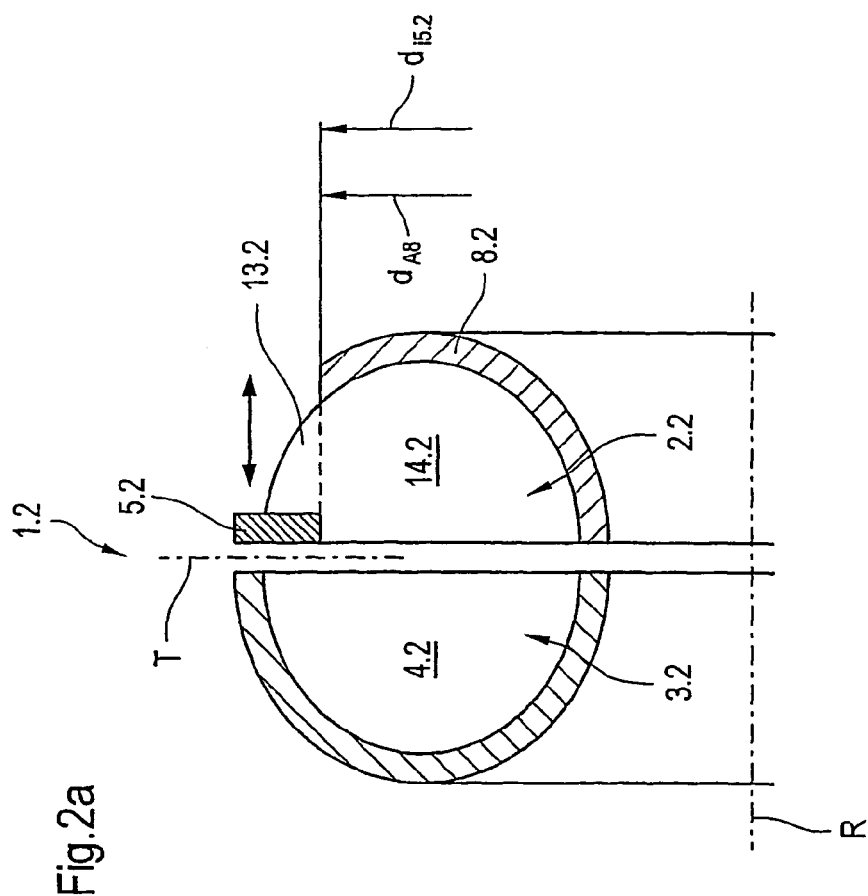

Contrary to this, FIGS. 2a and 2b demonstrate with the aid of two views an alternative arrangement of an implementation of a hydrodynamic clutch 1.2 with an axially displaceable baffle plate 5.2. The latter is constructed in this case as a separate component and displaceable in the axial direction opposite the impeller, here, for example, the primary impeller 2.2, in such a sway that a change of the active surface in the working chamber 4.2 arises through the displacement. The baffle plate 5.2 is in this case also constructed as an external baffle 6.2. That is, it is arranged in the external region of the working chamber 4.2 and is supported in it. The flow is thereby reversed in this region around the baffle and/or the baffle plate 5.2 before it overflows into the secondary impeller 3.2. In this implementation the blades 14.2 are arranged in such a way that they project into the radial external region of the primary impeller 2.2 over the blade carrying part 8.2, i.e., they are guided only over a part of their extension in the radial direction at the blade carrying part 8.2 and that the radial external region of the primary impeller 2.2 is free from the in figure 1 represented wall region 7.2. The baffle plate 5.2 is in this case constructed with slits and is guided at the individual blades 14.2 that are arranged in the circumferential direction at a distance to each other. These are preferably directed straight, i.e., the individual blade 14.2 in arranged in a plane which is characterized by a vertical theoretical rotation axis and the rotation axis. The axially displaceable baffle plate 5.2 is thereby guided in a region of the blade 14.2, here in particular a freely projecting blade region 13.2, which is free from a direct guidance on the blade carrying part 8.2 and is fixated in its position only by the other baffle regions in the blade carrying part 8.2. Implementations with slanted blading are likewise conceivable but then the guiding slits are to be designed with a corresponding width or the axial displacement is to be secured by twisting in the circumferential direction. According to the magnitude of the blade region 13.2 and/or the blade carrying part 8.2, the displacement in an axial direction can be guaranteed by individual guidance of the baffle plate 5.2 on the blading 14.2. An optimal displacement of the baffle plate 5.2 can be achieved in the case that the end region of the blading carrying region 8.2 lies in a plane that is perpendicular to a plane that is characterized by a perpendicular to the rotation axis and a perpendicular in the vertical direction and/or extends parallel to the parting plane T between the primary impeller 2.2 and secondary impeller 3.2. According to the arrangement of its internal diameter $d_{i5.2}$ this can take place either up to the region outside the impeller, here the primary impeller 2.2, or at least up to the region of the blade carrying part 8.2. If in the represented case the internal diameter $d_{i5.2}$ is equal or preferably larger than the external diameter $d_{A8}$ of the blade carrying part 8.2, then a concise displacement to the blade carrying part 8.2 can take place in the axial direction or even completely over the blade carrying part 8.2 out of the working chamber 4.2. However, this is not aimed at since then it is no longer possible to guide the baffle plate 5.2 without additional accessories. Preferably, implementations are thereby aimed at in which a displacement takes place as far as possible in the direction of the blade carrying part 8.2 and/or the inner wall that is formed by it. A concise termination and/or a stop function of the blade carrying part 8.2 is preferably aimed at.

In FIG. 2b an implementation is thereto represented, in a view from the right, of the baffle plate 5.2 provided with slits and/or guidings 16 relevant to the guidance at the individual blades 14.2 at the internal diameter $d_{i5.2}$. This implementation of the baffle plate 5.2 poses a possible implementation. However, the implementation according to the invention is not focused on this. The geometry of the slits 16 is adapted to the geometry of the blades 14.2.

FIGS. 3a to 3c demonstrate, in a schematically very simplified representation with the aid of a very simplified represented hydrodynamic clutch 1.3, additional arrangement possibilities of a baffle plate 5.3 that is, according to the invention, constructed as axially displaceable.

With respect to the connection and guidance of the baffle plate 5.3, the in FIGS. 1 and 2 described arrangement possibilities apply, but no limitation to these ensues thereby. In this connection representative reference can be made to these figures. The baffle plate 5.3a is assigned to the secondary impeller 3.3a in the implementation represented in FIG. 3a. The baffle plate 5.3a is here also constructed as an external baffle 6.3a and becomes active in the external radial region of the working chamber 4.3a, for example, at the secondary impeller 3.3a. The baffle plate 5.3a is also here preferably constructed as a washer. It can either be constructed in one piece with a wall region 7.3a or else, as described in FIG. 2a, can be guided in an analogous construction method on the blading 14.3a of the secondary impeller 3.3a. Concerning the external and internal diameter, the implementations carried out for the arrangement of the primary impeller 2.2a apply.

FIGS. 3b and 3c demonstrate in a schematically very simplified representation possibilities for the arrangement of an axially displaceable baffle plates 5.3b and 5.3c as internal baffle 17.3b and 17.3c, whereby the baffle plates 5.3b and 5.3c are each arranged in the region of the radial internal dimensions of the hydrodynamic clutch 1.3b, 1.3c, in particular of the working chamber 4.3b and 4.3c, respectively. The construction of the baffle plates 5.3b and 5.3c is always characterized by that its external diameter $d_{A5.3b}$, respectively, $d_{A5.3c}$, is always larger than the internal diameter $d_{i4.3b}$, respectively, $d_{i4.3c}$, of the working chamber 4.3b, respectively, 4.3c, as well as especially $d_{2.3b}$ or $d_{2.3c}$, respectively, $d_{i3.3b}$ or $d_{i3.3c}$, and smaller than the internal diameter $d_{i4.3b}$, respectively, $d_{i4.3c}$, of the working chamber 4.3b, 4.3c and/or of the internal diameter, which is determined by the impellers 2.3b, 2.3c and 3.3b, 3.3c, in the external region of the hydrodynamic clutch 1.3b and 1.3c. The baffle plates 5.3b and 5.3c extend therefore at least partly in the radial direction into the working chamber 4.3b and 4.3c, respectively. As an example, FIG. 3b demonstrates thereby an arrangement of the baffle plate 5.3b on the primary impeller 2.3b, whereby the arrangement is characterized in the region of the internal diameter of the sub region of the working chamber 4.3b that is determined by the primary impeller 3.3b. The baffle plate 5.3b and the wall region 7.3b in this implementation constitute thereby, for example, a structural unit, whereby the wall region 7.3b of the blade carrying part 8.3b is displaceable.

The displaceability is here also in the axial direction. On the other hand, FIG. 3c demonstrates an implementation according to FIG. 2 with an arrangement for the secondary impeller 3.3c, in which the baffle plate is constructed with slits 18 arranged on the external circumference, which is led into the blade region 13.3c, which is free from a guidance on the blade carrying part 8.3c.

Figure 4A:
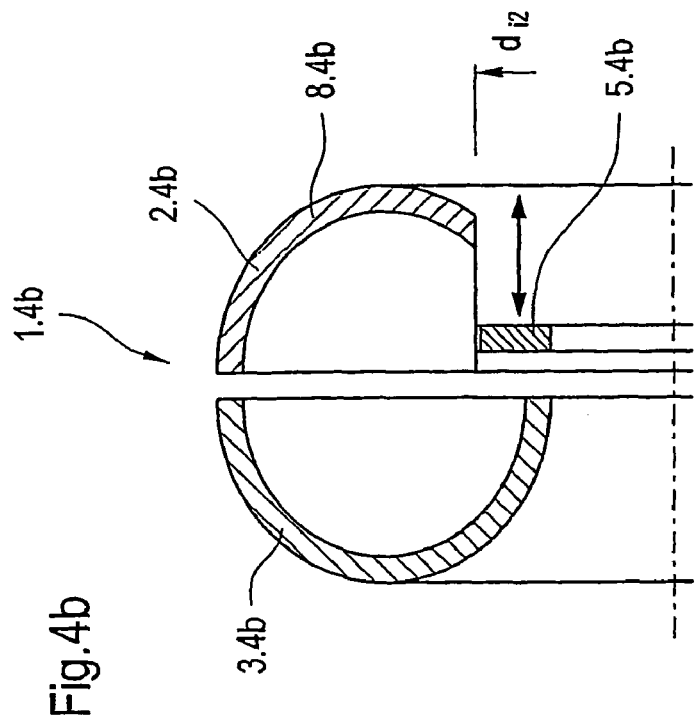
FIGS. 4a and 4b demonstrate particular advantageous constructions with external and internal baffle.
Figure 4B:
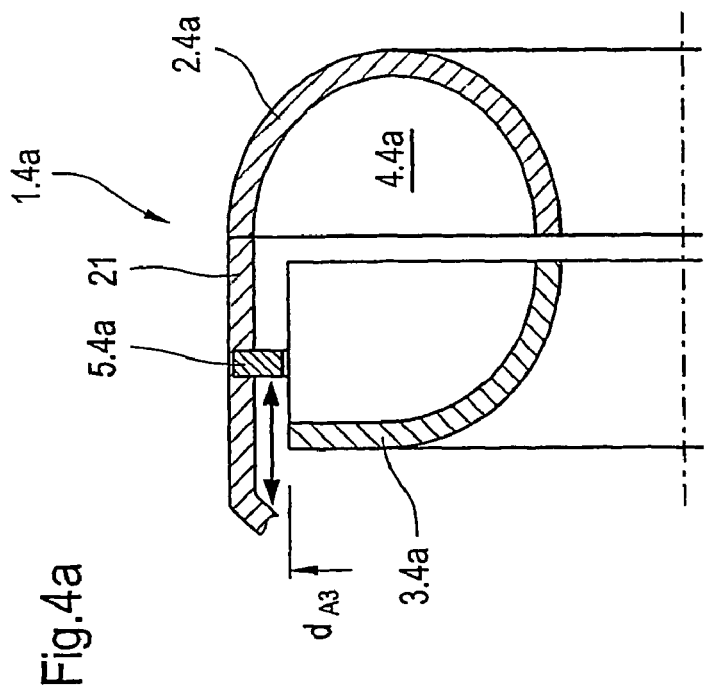

According to a particularly advantageous arrangement 1.4a, the impeller, according to FIG. 4a, which leads the circulation in the form of the primary impeller 2.4a, or, according to FIG. 4b, the secondary impeller 3.4b, is constructed such a way that it is implemented to be turned away in the region of the guidance for the baffle plates 5.4a, 5.4b. This means that the impeller, viewed in cross section, is free from an impeller segment 19 that is provided either in the radial external region of the impellers 2.4a, 3.4d, or else, dependent on the arrangement of the baffle plates 5.4a, 5.4b, in the radial internal region. In addition, the impeller 2.4a, 3.4b is in this region, in particular the blading, preferably turned away. This turning away is characterized by that the blade 14.4a, 14.4b, viewed in cross-section, is characterized by a straight edge in the radial direction either in the region of the radial external diameter $d_{A2}$, $d_{A3}$, or in the region of the radial internal diameter $d_{i2}$, $d_{i3}$, of the working chamber 4.4a, 4.4b and/or the blading 14.4a, 14.4b, and that in this region no guiding of the circulation flow takes place. According to the invention, the baffle plate 5.4a, 5.4b, respectively, is arranged in the region, that now is left out by the turning-away, and which is theoretically filled by the blading in the normal case, according to FIG. 4a in the region of the radial external diameter $d_{A3}$ of the secondary impeller 3.4a, and according to FIG. 4b in the region of the radial internal diameter $d_{i2}$ of the primary impeller 2.4b. The baffle plate 5.4a, 5.4b, can be displaced therefore unhindered opposite the impeller 2.4, whereby the displacement can take place arbitrarily. Furthermore, this possibility offers the advantage that the baffle plate 5.4a, 5.4b, no longer has to be guided on the impeller itself—primary impeller 2.4b or for the secondary impeller 3.4a—but can also be guided on an element that rotates with respect to it with a relative rotational speed.

Also a guidance on a stationary component, such as, for example, the here only implied casing 21, is conceivable.

Figure 5:
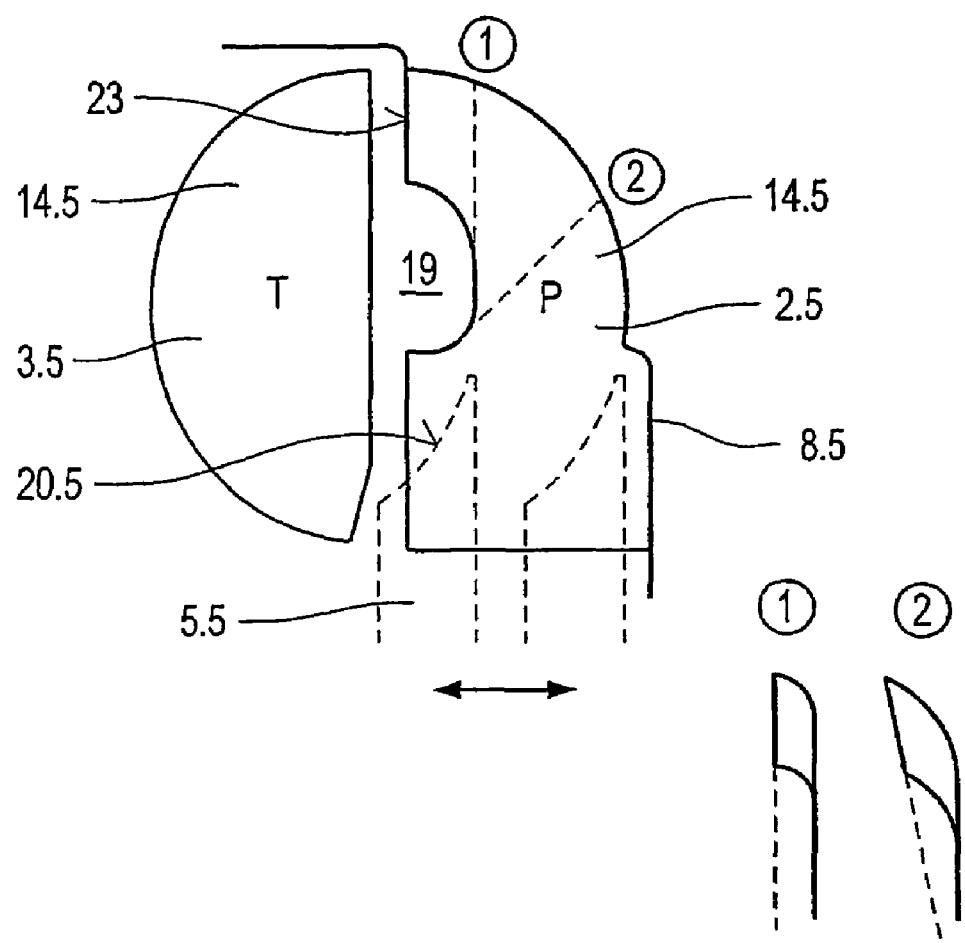
FIG. 5 shows a particular advantageous construction of a hydrodynamic clutch with baffle plate.

FIG. 5 demonstrates an additional advantageous arrangement of a hydrodynamic clutch, seen in cross-section in a schematically very simplified representation, with a baffle plate 5.5 which is according to the invention implemented to be axially displaceable. In the represented case, seen in cross-section, it is provided with a profile 22. The profile 22 is thereby implemented in such a way that it forms a guiding surface 20.5 for the flow of the circulation flow, whereby this surface extends unevenly parallel to the parting plane T. A contour that rises up to the center of the working chamber is preferably chosen. This means that the circulation flow on the baffle plate 5.5 is deflected according to the geometry and the progression of the guiding surface 20.5. This baffle plate 5.5 is also displaceable in the axial direction and makes it in a corresponding arrangement possible that, in a situation of a not desired influencing, a guiding surface flush with the remaining blade carrying part 8.5 and which, without the direction change that follows the circulation flow in relation to the theoretical progression, follows the blade carrying part 8.5, and normally describes the internal contour of the impeller 2.5 or 3.5—according to the assignment to the primary impeller or the secondary impeller. The blading 14.5 is provided, in the region of the blade ends 23 which point to the blading of the other impellers, here of the secondary wheel 3.5, with a recess under the formation of a core chamber 19.

Furthermore, the blading 14.5 of the primary wheel 2.5 is constructed over its radial extension with regions of different directions. The region of each blade 14 of the blading 14.5 that guides the baffle plate 5.5 in the represented case is thereby constructed straight and the part that extends in the radial direction outside the region that guides the baffle plate 5.5 is thereby constructed inclined in relation to a plane that extends perpendicular to the parting plane T.

FIGS. 6a and 6b demonstrate in a schematically very simplified representation possible applications of the clutch 1 according to the invention.

It can be implemented according to FIG. 6a with a rotating casing 21 in the form of a primary impeller cup 24 or, according to FIG. 6b, it can enclosed by a stationary casing 25. A guidance of the element that forms a baffle or interference location can, according to the arrangement of the clutch 1 and the blading 14, also take place on the casing 21 and/or 25.

Figure 6C:
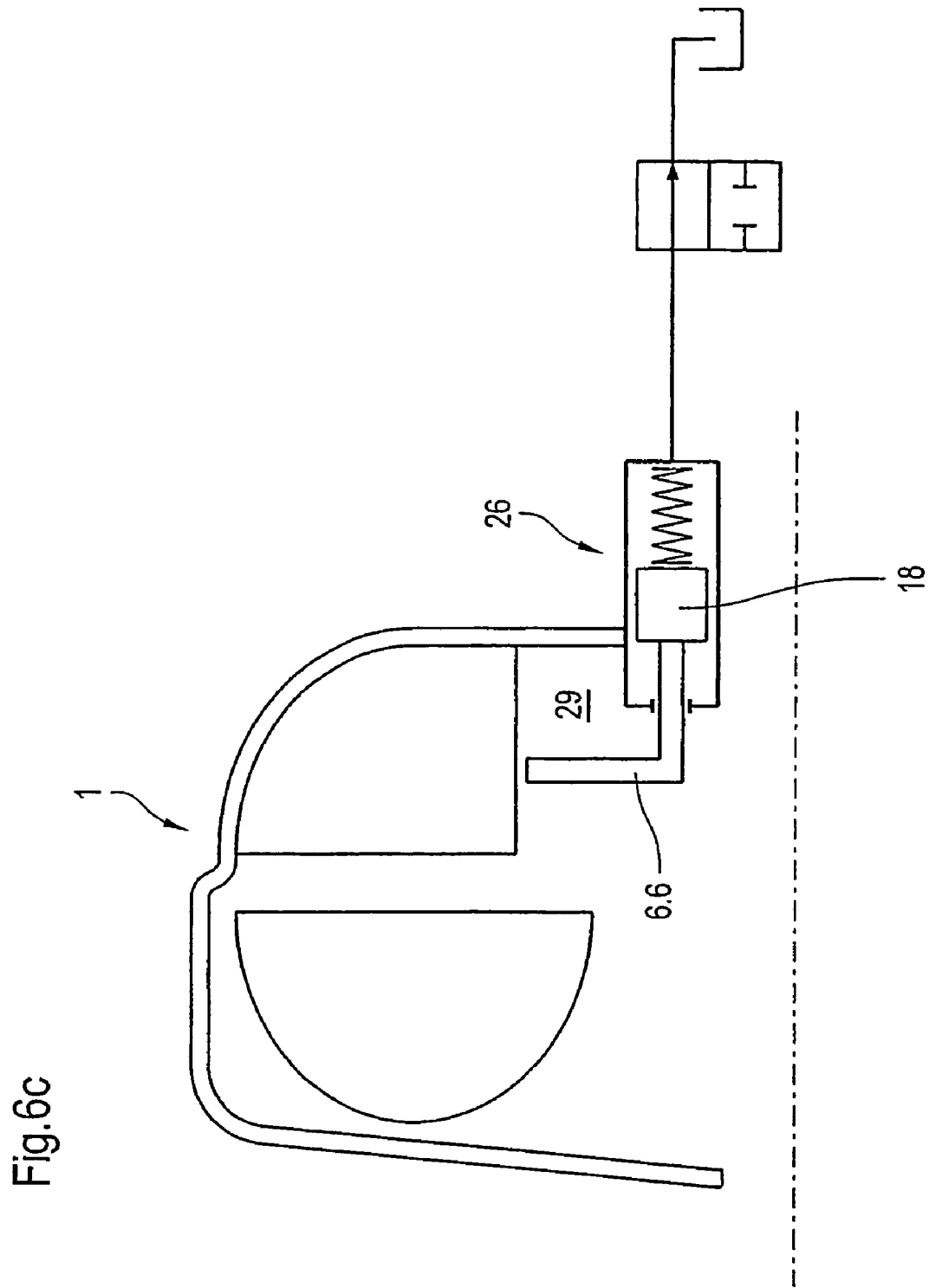
FIG. 6c shows a possible implementation with the control unit assigned to the baffle plate.

FIG. 6c demonstrates with the aid of an implementation according to FIG. 3c a possible arrangement with a control unit 26. This is, for example, constructed as a cylinder-/piston unit. The actuation of the piston 18 that is coupled to the baffle plate 6.6 takes thereby place, for example, with a differential pressure that is formed from the casing inner space 29 and a control pressure.

As an example, FIG. 7 demonstrates with the aid of a ny(v)-λ-diagram the operation mode of the element 5, which forms the interference and baffle region, plotted in different positions over the rotational speed ratio. This shows that precisely in the startup region, i.e., at very high slippage, in relation to the known implementations from the state of the art, substantially smaller torques are picked-up because of the action of the baffle plate 5 in the region of the parting plane T.

At very low slippage, i.e., a thereto proportional rotational speed ratio ny(v) in the range of 1 during the ensuing displacement of the baffle plate 5 still outside the working chamber and/or in a position in which it does no longer affects an interference of the circulation flow, the effect of the baffle plate is not detectable.

In general the displacement of the baffle plate preferably takes place every time starting from the region of the parting plane between the impellers over at least a sub region of the axial extension of the respective impeller, i.e., a part of the working chamber, preferably outside it. However, displaceability over a part of the axial extension of both impellers would also be conceivable, whereby the surrounding, in particular the mounting and/or the guiding of the baffle plate, would be adapted correspondingly.

SYMBOL REFERENCE LIST 1, 1.2, 1.3a,
1.3b, 1.3c,
1.4a, 1.4b hydrodynamic clutch
2, 2.2, 2.3a
2.3b, 2.3c,
2.4, 2.4a, 2.4b primary impeller
3, 3.2, 3.3a,
3.3b, 3.3c, 3.4,
3.4a, 3.4b secondary impeller
4,4.2,4.3a,
4.3b, 4.3c,
4.4, 4.4a, 4.4b working chamber
5, 5.2, 5.3a
5.3b, 5.3c, 5.4a
5.4b, 5.5 baffle plate
6, 6.2, 6.3a external baffle
7,7.2 wall region
8,8.2 blade carrying part
9 front surface
10 front surface
11 front side
12 front side
13 blade region
14 Blade
16 slit
17.3b,17.3c internal baffle
18 slit
19 core chamber
20 active and/or influencing surface
21 casing
22 profile
23 blade end
24 primary impeller cup
25 stationary casing
26 control unit
27 cylinder-/piston unit
28 piston
29 casing inner chamber
I displacement
$S_7$ wall thickness
a sub region
T parting plane
R rotation axis
$d_{A4}$ external diameter of the working chamber
$d_{A2}$ external diameter of the primary impeller
$d_{I5}$ internal diameter of the baffle plate
$d_{I4}$ internal diameter of the working chamber
$d_{A8}$ external diameter of the blade carrying part
$d_{A5}$ external diameter of the baffle plate $p_{i7\text{-}2}$ internal diameter of the primary impeller in the region of the radial external dimension $d_{i5.2}$ internal diameter of the baffle plate

The invention claimed is:

1. A hydrodynamic clutch comprising a primary impeller; a secondary impeller, which forms a working chamber with the primary impeller; and a means for influencing a transmission ratio of the hydrodynamic clutch, comprising an element which forms an interference or baffle region, wherein said element is a ring-shaped disk or a washer segment that extends at least partly into the working chamber and is displaceable in an axial direction in the working chamber.

2. The hydrodynamic clutch according to claim 1, wherein the element is a ring shaped disk that comprises front sides, which point away from each other and are arranged parallel to each other.

3. The-hydrodynamic clutch according to claim 1, wherein the element that forms an interference or baffle region is a ring shaped disk, and wherein a front side of the ring shaped disk element, which points in between the impellers to a parting plane, is constructed with an inclination over at least a part of its radial extension in a direction radial to a central diameter of the working chamber.

4. The hydrodynamic clutch according to claim 3, wherein the front side of the ring shaped disk element, which points in between the impellers to the parting plane, is constructed unevenly in a direction radial to the central diameter of the working chamber.

5. A hydrodynamic clutch according to claim 4, wherein the front side, which points in between the impellers to the parting plane, is curved in the direction radial to a central diameter of the working chamber.

6. The hydrodynamic clutch according to claim 1, wherein the element which forms an interference or baffle region is arranged, viewed in a radial direction, in a region of an external diameter of the working chamber and comprises an internal diameter that is larger than an internal diameter of the working chamber.

7. The hydrodynamic clutch according to claim 1, wherein the element which forms the interference or baffle region is arranged in a region of an internal diameter of the working chamber and comprises an external diameter that is smaller than an external diameter of the working chamber.

8. The hydrodynamic clutch according to claim 1, wherein the element is assigned to one of the two impellers, whereby the one of the two impellers comprises a blade carrying part, which contains a wall region that is displaceable in an axial direction and guides flow circulation and wherein the element which forms the baffle and interference region forms a structural unit with the wall region.

9. The hydrodynamic clutch according to claim 8, wherein the element which forms the baffle or interference region forms an integral unit with the wall region.

10. The hydrodynamic clutch according to claim 1, wherein the element which forms the interference or baffle region is constructed as a separate component.

11. The hydrodynamic clutch, according to claim 10, wherein:
the element which forms the interference or baffle region is assigned to one of the two impellers;
the one of the two impellers contains a blade carrying part;
the blade carrying part extends, viewed in a radial direction, always only over a part of an extension of individual blades of a blading in this direction;
the blades of the blading freely project in a radial direction in a region of an internal diameter or an external diameter of the working chamber in a region that is free from the blade carrying part; and
the element which forms the interference or baffle region contains on an external circumference or an inner circumference guiding slits for guiding the blades of the blading which are arranged adjacent to each other in a circumferential direction.

12. The hydrodynamic clutch, according to claim 10, wherein:
the element which forms the interference or baffle region is assigned one of the impellers;
the one of the impellers contains a blade carrying part; and
the blade carrying part and a blading, viewed in a radial direction, include at an internal diameter or an external diameter of the one of the impellers, a constant diameter over an axial extension, whereby this is formed by shaping a blade part segment with a pertinent sub region of the blade carrying part.

13. The hydrodynamic clutch according to claim 12, wherein the element which forms the interference or baffle region is guided by the impeller to which it is assigned, or by an element that is coupled torque proof to the assigned impeller.

14. The hydrodynamic clutch according to claim 10, wherein the element which forms the interference or baffle region is guided by an element which rotates relative to one of the impellers or by an element that is coupled torque proof to one of the impellers.

15. The hydrodynamic clutch according to claim 10, wherein the element which forms the interference or baffle region is guided at a stationary component or casing or by an element which is coupled torque proof to an impeller.

16. The hydrodynamic clutch according to claim 1, wherein the element which forms the interference or baffle region is assigned to the primary impeller.

17. The hydrodynamic clutch according to claim 1, wherein the element which forms the interference or baffle region is assigned to the secondary impeller.

18. A hydrodynamic clutch according to claim 1, wherein the means for influencing the transmission ratio of the hydrodynamic clutch includes a means for influencing a circulation flow in the working chamber.

19. Procedure for influencing a torque that a hydrodynamic clutch can absorb comprising, providing the hydrodynamic clutch with a primary and a secondary impeller which together form a working chamber; and providing the hydrodynamic clutch with at least an element which forms a baffle or interference region for circulation flow, which extends at least partly into the working chamber, wherein the element which forms the baffle or interference region is a ring-shaped disk or washer segment that is displaceable in an axial direction in the working chamber.

20. Procedure according to claim 19, wherein the element which forms the baffle or interference region is active at high slippage values in a region of a parting plane in the working chamber and the influencing of the torque can be described as a function of a position of the element that forms at least a baffle or interference region.

* * * * *